Dec. 18, 1928.
E. F. B. CAMPBELL
1,695,451
DENTAL MIRROR
Filed July 18, 1927
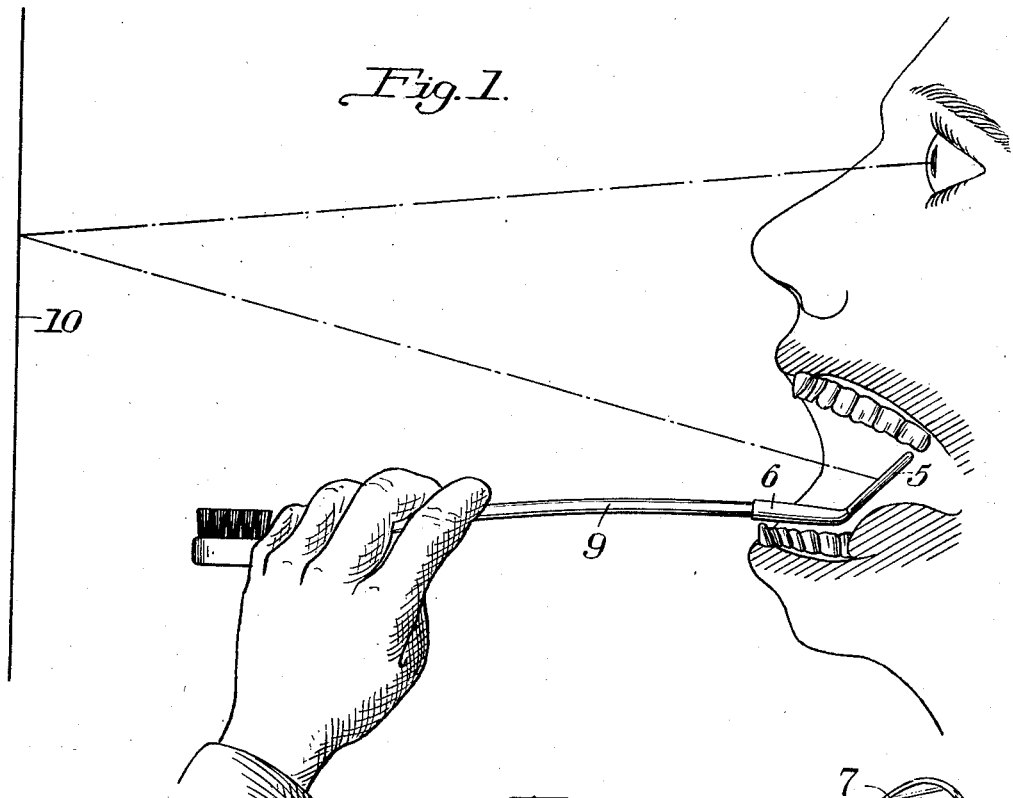
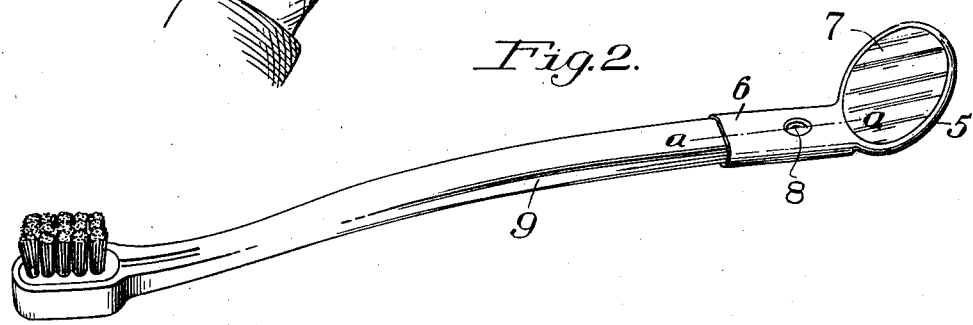
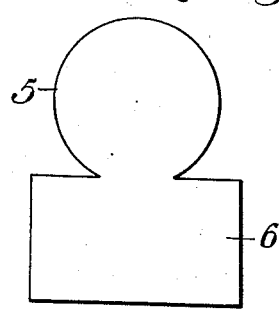
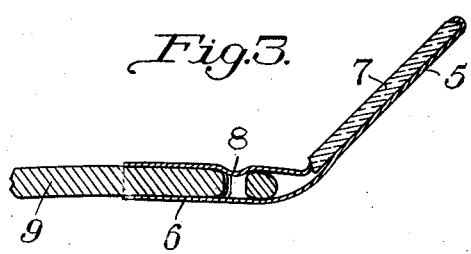
INVENTOR
Earl F. B. Campbell
By Archworth Martin,
Attorney.

Patented Dec. 18, 1928.

1,695,451

UNITED STATES PATENT OFFICE.

EARL F. B. CAMPBELL, OF NEW KENSINGTON, PENNSYLVANIA, ASSIGNOR OF ONE-HALF TO EVAN J. FRANCIS, OF NEW KENSINGTON, PENNSYLVANIA.

DENTAL MIRROR.

Application filed July 18, 1927. Serial No. 206,490.

My invention relates to mirrors especially suited for a personal examination by an individual of his own teeth.

One of the objects of my invention is to provide a mirror structure whereby the user may examine his teeth, and particularly the rear lingual or distal surfaces of his front teeth, and those distal buccal and lingual teeth located farther back in the mouth, or oral cavity, and inspect them for food débris, cavities, tartar stains, fillings, or any needed dental work.

Another object of my invention is to provide a mirror which may be conveniently attached to the handles of ordinary tooth brushes.

Still another object of my invention is to provide an improved form of mirror for examining cavernous spaces such as the human mouth.

One form which my invention may take is shown in the accompanying drawing, wherein Figure 1 is a view showing one manner in which the device may be employed; Fig. 2 is a perspective view of the mirror and tooth brush of Fig. 1, on an enlarged scale; Fig. 3 is a sectional view of a portion of the apparatus of Fig. 2, on a still further enlarged scale, and Fig. 4 is a plan view of a blank from which the holder for the mirror plate may be formed.

The mirror structure proper comprises a holder 5, having a socket-like extension 6 and containing the usual reflector plate 7 which may be of silvered glass. The holder 5 is preferably of ductile metal such as gold, silver, German silver, aluminum, tin, etc., of various gages, or may be of celluloid, ivory pyralin, etc., so that it can be readily pressed or bent to the desired shape. In assembling the device, the edge of the disc-like portion of the blank of Fig. 4 is bent over the edge of the plate 7 and the rectangular portion of the blank is bent to oval form and at an angle of about 45° to the disc-like portion of such blank. The longitudinal edges of the socket portion 6 may be formed with interlocking flanges, or welded together along the line a—a, so that such socket portion will not be spread when pushed into position upon a tooth brush holder. A depression 8 is formed in the socket that will snap into the holes usually provided in the ends of tooth brush handles for hanging them upon hooks. The holder will therefore be held upon a tooth brush handle 9 with sufficient firmness, but can be readily applied to and removed therefrom.

It will be understood that the handle 9 need not necessarily be that of a tooth brush, but may constitute merely an extension of the socket portion 6. When inspecting his teeth, the user will stand in front of a mirror 10, or may hold a hand mirror in a position corresponding to that of the mirror 10. Upon inserting the mirror 7 in his mouth, he will tilt the handle 9 to such position that the line of reflection from the mirror 7 to the mirror 10 will have such angularity that the reflection in the mirror 10 will be visible, as indicated by the dotted lines in Fig. 1. Experiments have shown that best results are obtained if the mirror plate 7 is disposed at an angle of about 45° with respect to the handle 9, since in such position, the hand of the user does not obstruct the line of reflection to the mirror 10, and the device readily lends itself to an inspection of either the upper or lower teeth, as the user's hand is always to one side of a line extending from the user's mouth to the mirror 10.

I claim as my invention:

1. Mirror structure comprising a reflector plate having a holder provided with a socket-like extension disposed at approximately 45° to the plane of the plate, said socket-like portion being adapted to receive a perforated handle of a tooth brush and having a depression for engagement with the perforation in said handle.

2. Mirror structure comprising a reflector plate having a holder provided with a socket-like extension disposed at an angle to the plane of the plate, said socket-like portion being adapted to receive the handle of a tooth brush and having an offset portion for engagement with a complementally offset portion on the tooth brush handle, to retain the holder in place on the handle.

In testimony whereof I, the said EARL F. B. CAMPBELL, have hereunto set my hand.

EARL F. B. CAMPBELL.